(No Model.)

W. BAYNES.
LUMBER BINDER.

No. 357,810. Patented Feb. 15, 1887.

William Baynes Inventor.
By Wilhelm Bonner,
Attorneys.

Theodore L. Popp
Geo. J. Buchheit Jr. Witnesses.

UNITED STATES PATENT OFFICE.

WILLIAM BAYNES, OF BUFFALO, NEW YORK, ASSIGNOR OF ONE-HALF TO A. RALPH CLARK, OF SAME PLACE.

LUMBER-BINDER.

SPECIFICATION forming part of Letters Patent No. 357,810, dated February 15, 1887.

Application filed August 25, 1886. Serial No. 211,866. (No model.)

*To all whom it may concern:*

Be it known that I, WILLIAM BAYNES, of the city of Buffalo, in the county of Erie and State of New York, have invented new and useful Improvements in Lumber-Binders, of which the following is a specification.

This invention relates to an improvement in the levers which are employed for tightening the binding-chains by which lumber and other heavy material are retained upon wagons and other vehicles while being transported from place to place.

The object of my invention is to provide a tightening-lever whereby the binding-chain can be readily drawn taut, and which will lie closely against the chain and load when tightened and hold the load securely in place upon the wagon.

My invention consists of the improved construction of the tightening-lever, which will be hereinafter described, and pointed out in the claim.

Figure 1:
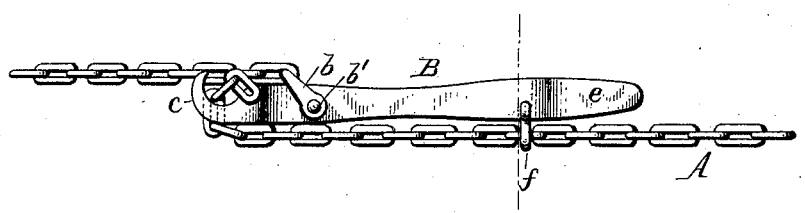
Figure 2:
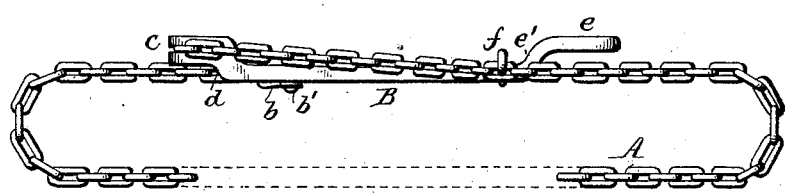
Figure 3:
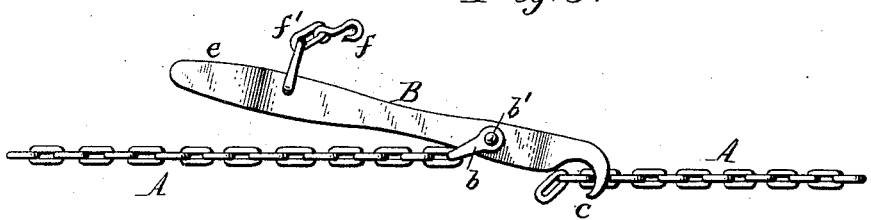
Figure 4:
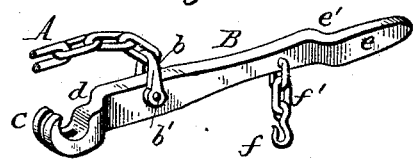

In the accompanying drawings, Figures 1 and 2 are elevations at right angles to each other of my improved tightening-lever in the position in which the ends of the chain are locked together. Fig. 3 is a similar view showing the locking-lever thrown backward to loosen the chain. Fig. 4 is a perspective view of the locking-lever.

Like letters of reference refer to like parts in the several figures.

A represents the binding-chain, which is passed around the body of the wagon and the load of lumber or other material placed thereon.

B represents the locking-lever whereby the chain is drawn tightly around the load. The lever B is secured to one end of the chain by a clip, $b$, which is inserted through one of the links of the chain, and is pivoted to the lever by a bolt or rivet, $b'$. The short arm of the lever B, which is nearest to the clip $b$, is provided with a bifurcated hook or claw, $c$, which engages over one of the links on the opposite end of the binding-chain when the chain has been passed around the load.

The lever B is formed with an offset or shoulder, $d$, between the claw and the body or main portion of the lever, so that the claw $c$ will stand out of line with the body of the lever or on one side of the same, and clear the end of the chain which is fastened to the lever by the link $b$ when the lever has been tightened, as shown in Figs. 1 and 2. The opposite end of the lever B terminates in a handle, $e$, which is connected with the body portion of the lever by an offset or shoulder, $e'$, so that the handle projects on one side of the body of the lever, and will not come in contact with the chain when the lever is depressed and the chain is tightened.

Upon passing the chain around the load and the body of the wagon, the ends of the chain are brought together and one of the links of the free end of the chain is engaged between the jaws of the claw $c$ of the lever, as shown in Fig. 3. The lever B is now swung forwardly, drawing both ends of the chain toward each other and tightening the chain around the load. When the lever has been moved forwardly or depressed sufficiently to tighten the chain, the lever is locked in position by a hook, $f$, which is attached to the lever by links $f'$ and inserted in one of the links of the chain.

If desired, the hook $f$ may be pivoted directly to the lever, as shown in Fig. 1. Upon disengaging the hook $f$ from the chain, the lever can be readily released and swung backwardly to disconnect the chain from the claw $c$ when desired to loosen the chain.

I claim as my invention—

The combination, with a binding-chain, A, of a tightening-lever, B, provided with a slotted claw, $c$, connected with the body of the lever by a lateral offset, $d$, a handle, $e$, connected with the body of the lever by a lateral offset, $e'$, and a clip, $b$, and locking-hook $f$, attached to the body of the lever, whereby the lever is enabled to lie closely against the chain and load when tightened, substantially as set forth.

Witness my hand this 17th day of August, 1886.

WILLIAM BAYNES.

Witnesses:
JNO. J. BONNER,
CARL F. GEYER.